United States Patent [19]
Brewer, Sr.

[11] 3,866,502
[45] Feb. 18, 1975

[54] GANG RIP SAW
[76] Inventor: Clarence R. Brewer, Sr., P.O. Box 211, Central City, Ky. 42330
[22] Filed: Mar. 8, 1974
[21] Appl. No.: 449,529

[52] U.S. Cl............ 83/477.2, 83/425.3, 83/447, 83/449, 83/478, 83/546, 83/DIG. 1
[51] Int. Cl.............. B23d 45/06, B23d 47/00
[58] Field of Search.......... 83/425.3, 425.4, 425.2, 83/477.2, 478, 546, 860, DIG. 1, 447, 449

[56] References Cited
UNITED STATES PATENTS
| | | | |
|---|---|---|---|
| 189,613 | 4/1877 | Dicey | 83/425.3 |
| 2,613,699 | 10/1952 | Dudek | 83/477.2 X |
| 3,141,482 | 7/1964 | Arness | 83/425.3 X |
| 3,289,713 | 12/1966 | Herzog | 83/477.2 |

*Primary Examiner*—Frank T. Yost
*Attorney, Agent, or Firm*—Clarence A. O'Brien; Harvey B. Jacobson

[57] ABSTRACT

A gang rip saw incorporating multiple rip blades adjustably mounted on a single driven arbor. The blade accommodating opening or well in the tabletop is adjusted to size by means of a sliding plate, the inner blade adjacent end of which mounts blade guiding replaceable inserts, preferably of aluminum. Similar inserts are replaceably mounted on the far side of the well.

9 Claims, 4 Drawing Figures

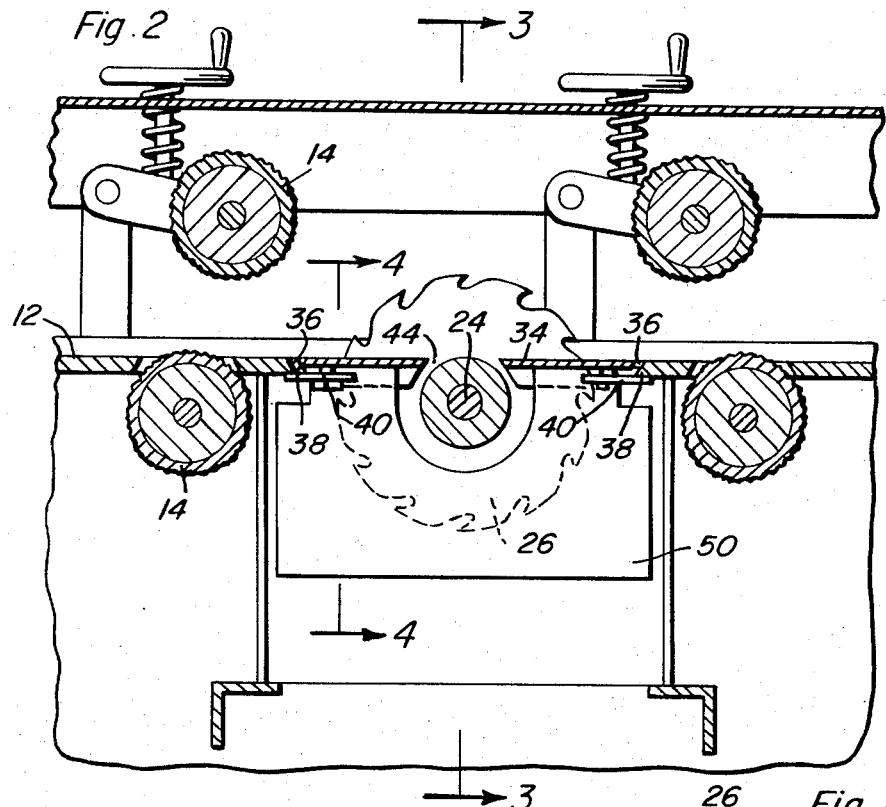
Fig. 2
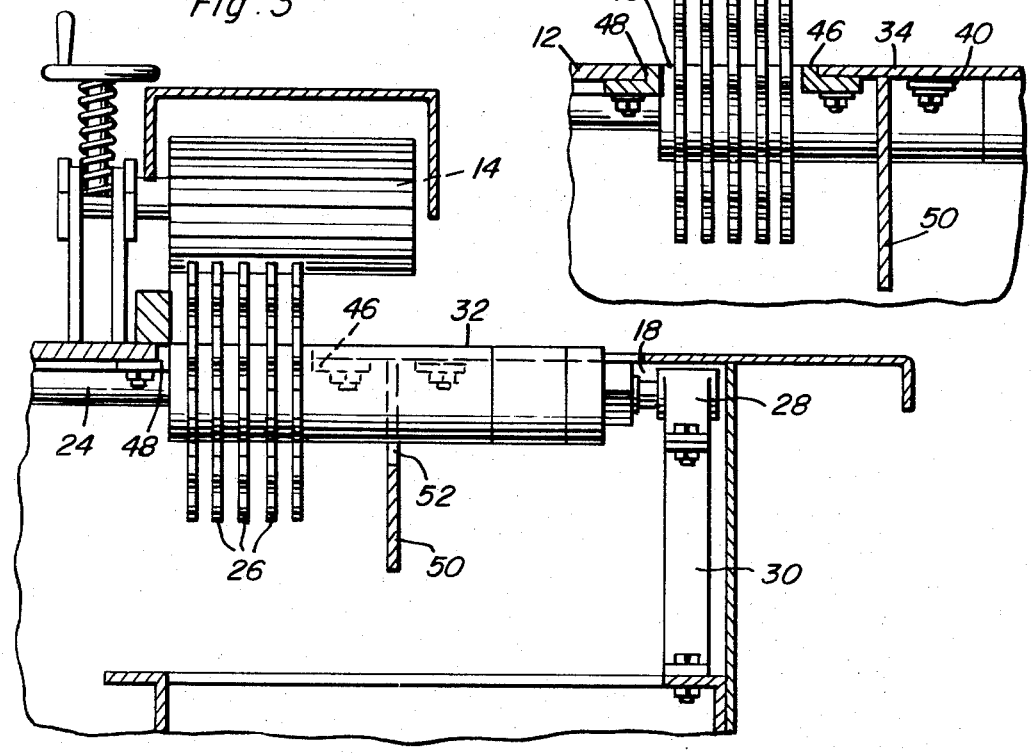
Fig. 3
Fig. 4

GANG RIP SAW

The present invention relates to new and useful improvements in gang rip saws.

More particularly, the machine herein eliminates the conventionally provided cover plate or throat plate utilized to support the wood as it passes through the gang blades, substituting therefor a unique sliding plate which is utilized so as to adjust the blade accommodating top opening by a conformance of the size of the opening to the blade placement through a simple sliding manipulation of the plate.

The invention herein also provides protective blade guiding inserts which prevent the lumber from hitting the steel tabletop and which provide an effective means for indicating misaligned blades without excessive blade or tabletop damage. In the more conventional machine, misalignment in the blades would frequently result in destruction of the wood throat plates requiring an expensive and time-consuming replacement thereof.

Other advantages of the present invention reside in the provision of a machine which can easily cut widths of from approximately ⅜ inch up to 12 inches, a machine which can accomodate any width lumber and a machine which utilizes a single arbor.

Basically, the gang rip saw is provided with a full width well accommodating a single powered arbor therealong transversely across the machine. The well is adjustably covered by a sliding plate which varies the exposed blade accommodating portion thereof in direct relation to the ganged blades being utilized. The inner or blade adjacent end of the sliding plate mounts a pair of inserts, preferably aluminum, which act as a contact means should any blade misalignment occur. Similar inserts are provided at the far side of the well opening.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is an enlarged cross-sectional detail transversely of the blade mounting arbor;

FIG. 3 is a transverse cross-sectional view taken substantially on a plane passing along line 3—3 in FIG. 2; and FIG. 4 is a transverse cross-sectional view taken substantially on a plane passing along 4—4 in FIG. 2.

Figure 1:
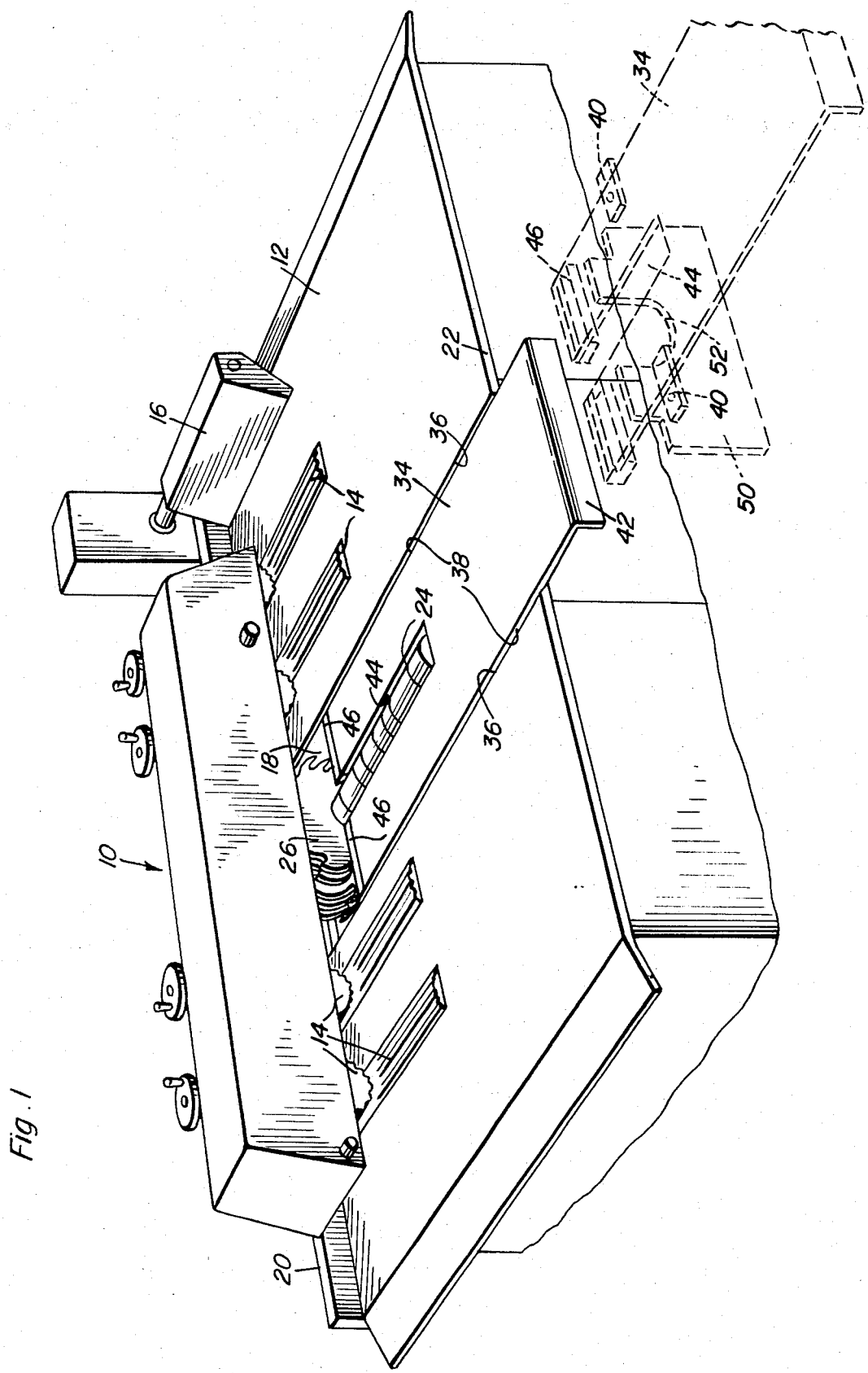
FIG. 1 is a perspective view of the gang rip saw assembly of the present invention.

Referring now more specifically to the drawings, the gang rip saw of the invention has been generally designated by reference numeral 10. This machine 10, in the manner of more conventional equipment, includes a steel tabletop 12, multiple upper and lower pairs of biased lumber gripping and guiding rollers 14, and a guard plate or panel 16 at the feed end of the machine.

The machine 10 differs from conventional equiment in that the top opening or blade well 18 extends across substantially the full width of the tabletop 12 commencing in inwardly spaced relation to the far or back side 20 of the machine and extending through the near or front edge 22 of the steel tabletop.

An elongated blade mountng arbor 24 extends longitudinally through the well 18 with the far or rear end thereof drivingly engaged with an appropriate motor for a power driving of the arbor and the ganged blades 26 mounted thereon. The front end of the arbor 24 is journaled within an appropriate journal box 28 affixed to the upper end of a frame bolted journal mounting post 30. The arbor 24, through a series of collars 32 selectively locked thereto can mount ganged blades in varying numbers and spacings in accordance with the cuts to be made. As will be appreciated, the substantially full width blade well 18 enables substantial variance in the blade arrangements with the resultant completely unencumbered tabletop outward from the back edge 20 thereof allowing for the accomodation of any width lumber.

The opening of the well 18, as will be appreciated, must be adjusted so as to generally closely conform to the ganged blades 26 whereby maximum support is provided for the lumber moving therethrough. In conventional equipment, separate wood throat plates would be cut for each blade arrangement. This would be an expensive and time-consuming operation. In addition, any misalignment of the blades during operation would in effect result in a destruction of the throat plate requiring the construction of a new throat plate subsequent to a realignment of the blades.

In order to avoid these problems, the present invention contemplates the utilization of an adjustable sliding plate 34 which, coplanar with the steel tabletop 12, slides into and over the well opening through the open end thereof at the near or front edge of the top 12. This panel 34 slidably engages the opposed well forming edges 36 of the top 12, which may be beveled, rabbeted or the like for sliding engagement with correspondingly formed side edges 38 on the panel 34. As will be appreciated, this results in a sliding support of the panel 34 coplanar with the tabletop 12.

The sliding plate 34 is retained by a pair of opposed hold-down bars 40 bolted to the undersurface of the sliding plate 34 adjacent the opposed longitudinal edges thereof and in a manner so as to project laterally therefrom into sliding underlying relation to the opposed edge portions of the tabletop 12 to the opposite sides of the well opening.

The outer edge of the sliding plate 34 is downturned so as to provide a full width flange 42 by which the plate 34 is easily grasped and manipulated. In addition, extending centrally into the plate 34 from the inner edge thereof, is an elongated arbor accommodating slot 44, the arbor, or more particularly the blade mounting collars 32 thereon, lying generally at or immediately below the upper surface whereby a maximum height blade is achieved.

Mounted along the inner edge of the sliding plate 34 is a pair of inserts 46. These inserts 46 are generally L-shaped with a portion underlying and bolted to the edge portion of the plate 34 and a second upstanding portion lying along and extending inwardly of the edge itself. A second single or pair of inserts 48 is provided parallel to the inserts 46 along the inner fixed edge of the well opening 18. These inserts are, through the bolted mounting thereof, easily replaced should they be damaged by the saw blades 26. While the inserts are to preferably be of aluminum, other materials can be utilized.

The primary function of the inserts is to protect the blades and tabletop. In connection therewith, it is pointed out that the saw blades, in gang rip saw assemblies as herein involved, will frequently, during periods of extended use, become misaligned. In such a circumstance, the blades will come in contact with the aluminum inserts and provide a clearly audible warning sound which will enable a discontinuance of the operation prior to any extensive damage to the saw blades or for that matter the inserts themselves. Once the trouble is detectd, the plate 34 is slid outwardly from the tabletop exposing the arbor for a repair or replacement of the blades. It will be appreciated that the simple bolt mounting of the journal box mounting post 30 allows a quick removal thereof so as to expose the entire end of the arbor for such work as is deemed necessary. The inserts themselves, should they become damaged, can also be easily unbolted and replaced. This simplified arrangement contrasts sharply with the more conventional situation wherein wooden throat plates are specifically constructed for each gang saw arrangement. Such wooden throat plates are easily damaged by misaligned blades and require a substantial expenditure in time and effort in replacing the plates. Such problems are avoided with the assembly set forth herein.

Incidentally, with regard to the sliding plate 34, a transverse combined guard and stiffening panel 50 will normally be affixed transversely thereacross in depending relation therebelow toward the inner end thereof. This will be best appreciated from FIGS. 1 and 4 wherein it will be noted that the panel 50 has a central recessed portion 52 aligned with and corresponding to the slot 44, for the accommodation of the arbor.

From the foregoing, it should be appreciated that a highly unique gang saw table structure has been defined. The construction involved herein provides for an infinitely variable blade opening through the utilization of a sliding plate arrangement which avoids the necessity of utilizing individually formed covers. Also of significance is the use of aluminum or the like blade guiding inserts which protect both the table and the blades and provide a substantially non-damaging means for indicating blade misalignment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a gang rip saw, a tabletop, a transversely elongated blade accommodating opening through said top, a well below said opening, an elongated blade mounting arbor in said well extending longitudinally of the opening, ganged blades mounted on said arbor and extending through said opening, and adjustable means for varying the length of said opening transversely of the top to adapt the size of the opening to the specific ganged blade arrangement.

2. The machine of claim 1 wherein said top includes a front edge and a rear edge, said opening extending through the front edge and to a point inward of the rear edge.

3. The machine of claim 2 wherein said adjustable means comprises a flat plate slidably positioned over said opening through the front edge of the tabletop.

4. The machine of claim 3 wherein said plate is coplanar with the tabletop.

5. The machine of claim 4 wherein said blade accommodating opening has an inner side edge defined by the tabletop, said plate having an inner edge which defines the second side edge of the blade accommodating opening, and replaceable blade paralleling inserts mounted on said edges.

6. The machine of claim 5 wherein said plate has a slot extending centrally therealong from the inner edge of the plate for the accommodation of the arbor.

7. The machine of claim 6 including a stiffening panel fixed to and depending from said sliding plate.

8. The machine of claim 7 including mating edges on said sliding plate and said tabletop to the opposite sides of the opening for a slidable mounting of said plate on said tabletop.

9. The machine of claim 1 wherein said adjustable means comprises a flat plate slidably mounted over said opening.

* * * * *